United States Patent [19]
Sugawara et al.

[11] Patent Number: 5,828,557
[45] Date of Patent: Oct. 27, 1998

[54] FLYBACK TRANSFORMER

[75] Inventors: Yoshihiko Sugawara; Hideyuki Mochida, both of Yokohama, Japan

[73] Assignee: Hitachi Media Electronics Co., Ltd., Iwate-ken, Japan

[21] Appl. No.: 739,203

[22] Filed: Oct. 30, 1996

[30] Foreign Application Priority Data

Oct. 31, 1995 [JP] Japan .................................. 7-283602

[51] Int. Cl.⁶ ........................... H02M 3/335; H01J 29/70
[52] U.S. Cl. ................. 363/20; 363/21; 315/411
[58] Field of Search ....................... 363/20, 21; 315/411; 348/730

[56] References Cited

U.S. PATENT DOCUMENTS

| | | | |
|---|---|---|---|
| 4,639,663 | 1/1987 | Ueno et al. ............................. | 363/20 |
| 4,866,353 | 9/1989 | Haferl .................................... | 315/411 |
| 5,043,598 | 8/1991 | Maeda et al. .......................... | 363/21 |
| 5,218,270 | 6/1993 | Haapakoski . | |
| 5,394,067 | 2/1995 | Santelmann, Jr. ..................... | 363/21 |
| 5,466,994 | 11/1995 | Akimoto et al. ....................... | 315/411 |
| 5,644,198 | 7/1997 | Park ....................................... | 363/20 |

*Primary Examiner*—Stuart N. Hecker
*Attorney, Agent, or Firm*—Evenson, McKeown, Edwards & Lenahan, P.L.L.C.

[57] ABSTRACT

A flyback transformer which comprises: a primary-side coil; a secondary-side high-voltage coil divided into a predetermined number of coil pieces; high-voltage rectifier diodes connected, in the same polarity, in series with the coil pieces respectively so as to form a series circuit as a whole; a high-voltage capacitor connected to a cathode side of one of the high-voltage rectifier diodes located in a final stage of the series circuit; and an in-phase high-voltage coil reversely connected to the one high-voltage rectifier diode in the final stage of the series circuit so that a reverse pulse generated by the in-phase high-voltage coil is superimposed on the cathode side of the one high-voltage rectifier diode. Thus, an alternating electric field can be reduced without using any expensive externally-provided high-voltage capacitor which is insulated by an exterior housing and injection resin to thereby make it possible to provide a flyback transformer which is inexpensive in cost, which is high in reliability in view of insulation, and which is easy in handling.

4 Claims, 9 Drawing Sheets

FLYBACK TRANSFORMER

BACKGROUND OF THE INVENTION

1. Field of the Invention

The present invention relates to a flyback transformer (hereinafter abbreviated to "FBT") for use, for example, in a display monitor using a cathode-ray tube, and particularly to an FBT in which, not only an alternating electric field transmitted out, for example, through a surface, or the like, of a picture tube can be reduced and an expensive externally-provided high-voltage capacitor can be eliminated.

2. Description of the Related Art

Figure 6:
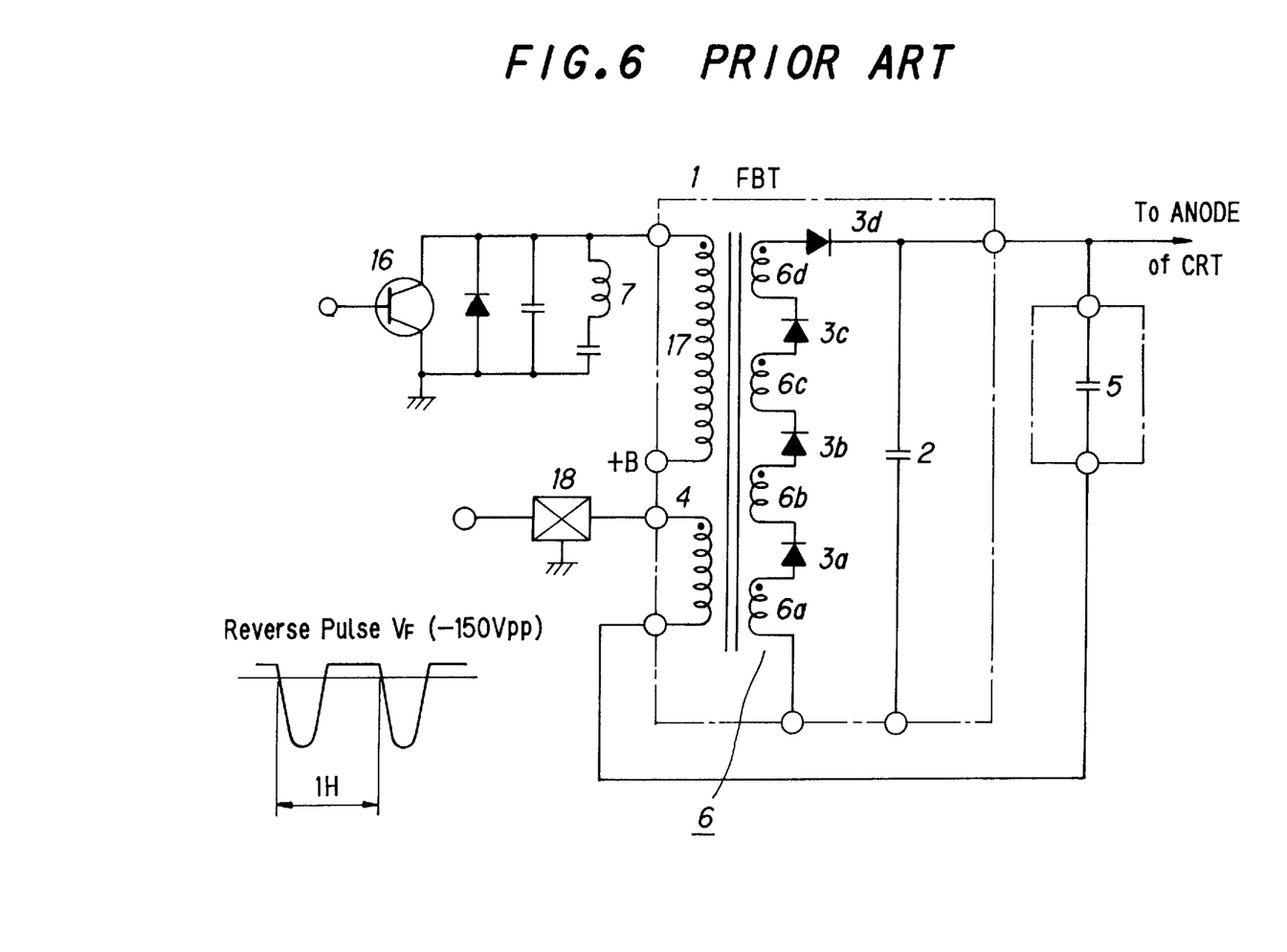
FIG. 6 is a circuit diagram of a conventional flyback transformer which is intended to reduce an alternating electric field.

FIG. 6 shows an example of a circuit for reducing an alternating electric field transmitted out through a surface or the like of a cathode-ray tube by using an externally-provided high-voltage capacitor in an FBT of a general display monitor. This conventional system is an example in which the technique disclosed in U.S. Pat. No. 5,218,270 is applied.

In FIG. 6, the circuit includes an FBT 1, a built-in high-voltage capacitor 2, high-voltage rectifier diodes 3a, 3b, 3c, and 3d, a tertiary-side winding 4 for generating a reverse pulse, an externally-provided high-voltage capacitor 5, secondary-side high-voltage coil pieces 6a, 6b, 6c and 6d, a deflecting yoke 7, a horizontal output transistor 16, a primary-side low-voltage coil 17 and a waveform comparison/controller 18.

Figure 7:
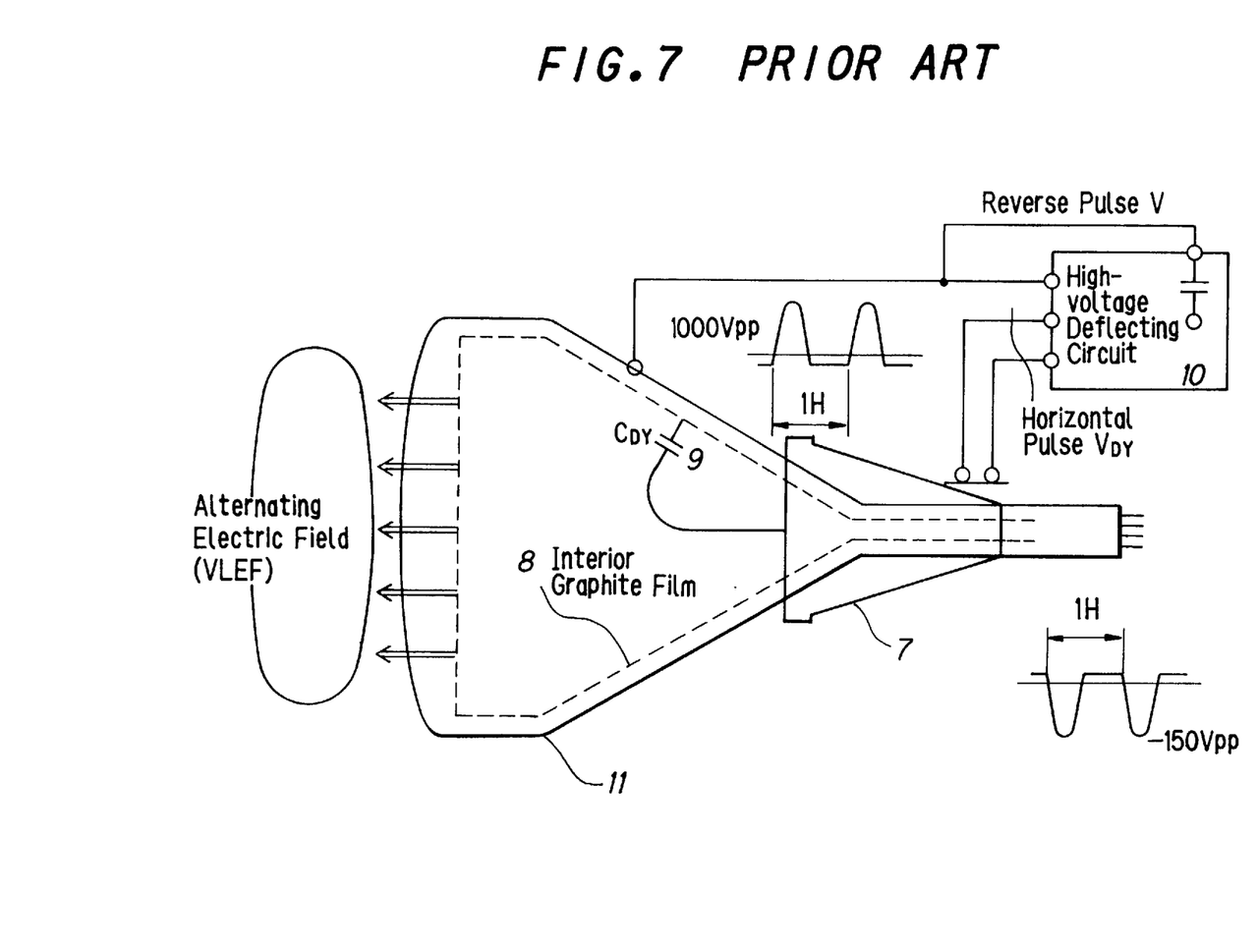
FIG. 7 is a diagram showing the alternating electric field reducing system in the flyback transformer of FIG. 6.

FIG. 7 shows an example of a conventional alternating electric field reducing system. In FIG. 7, the reference numeral 8 designates an interior graphite film; 9, an electrostatic capacity of the deflecting yoke 7; 10, a high-voltage deflecting circuit; and 11, a cathode-ray tube.

Figure 8:
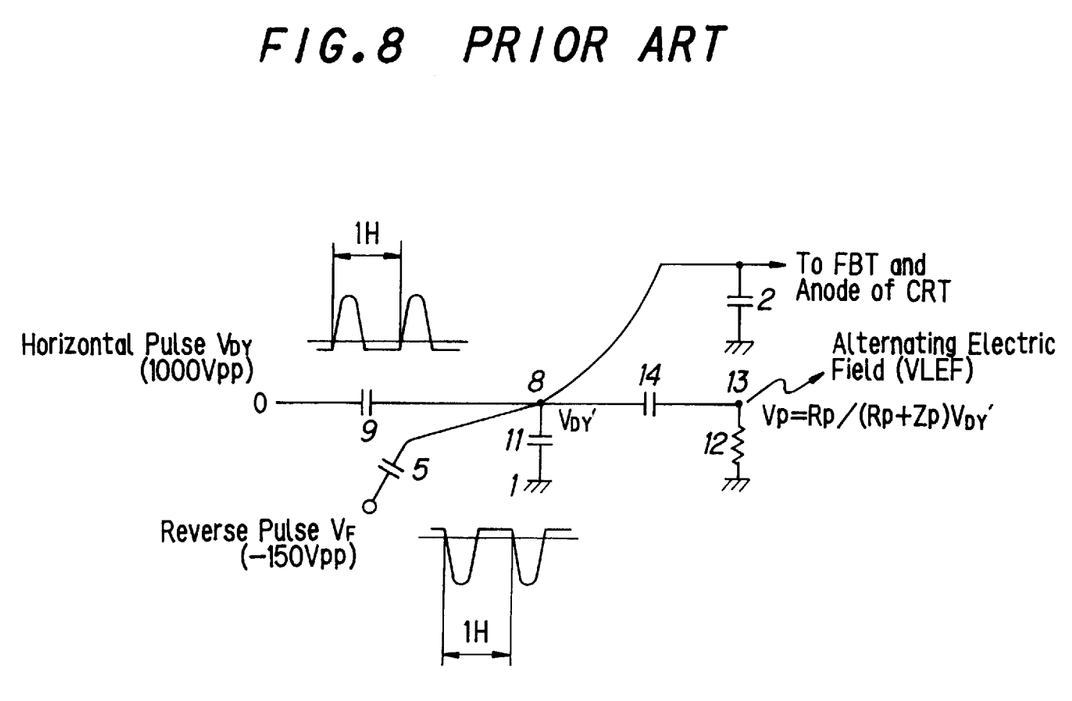
FIG. 8 is a diagram of an equivalent circuit of the alternating electric field reducing system.

FIG. 8 is a circuit diagram in which the example of the alternating electric field reducing system shown in FIG. 7 is equivalently illustrated. In FIG. 8, the reference numeral 13 designates a panel transparent conductive film; 13, a surface resistance of the panel transparent conductive film 13; and 14, a capacity of the panel transparent conductive film 13.

In this equivalent circuit, the alternating electric field is reduced by the following operation. That is, a horizontal pulse $V_{DY}$ (1000 $V_{pp}$) for driving the deflecting yoke 7 is applied to the interior graphite film 8 of the cathode-ray tube 11 through the electrostatic capacity 9 ($C_{DY}$=60 pF) of the deflecting yoke 7 so that a pulse voltage $V_{DY}'$ is produced. The pulse voltage $V_{DY}'$ is impedance-divided by the capacity 14 of the panel transparent conductive film 13 and the surface resistance 12 of the panel transparent conductive film 13 so that a voltage $V_p$ is produced on the panel transparent conductive film 13, so that the voltage $V_p$ becomes a source of generation of an alternating electric field (VLEF).

As an example for reducing this alternating electric field, there is a method in which a reverse pulse $V_F$ (−150 $V_{pp}$) obtained by the reverse pulse generating winding 4 provided on the tertiary side of the FBT 1 is applied to the interior graphite film 8 through the externally-provided high-voltage capacitor 5 (capacity: $C_F$=200 pF) of the FBT 1. In this method, the pulse voltage $V_{DY}'$ is canceled by the reverse pulse $V_F$ in interior graphite film 8 so that the amplitude of the pulse voltage $V_{DY}'$ which generates the alternating electric field VLEF is reduced.

This relation can be expressed by the following expression (1).

$$k \times C_{DY}(60pF) \times V_{DY}(-1000V_{PP}) = \quad (1)$$

$$-3 \times 10E - 8[C] = C_F(200pF) \times V_F(-150V_{PP})$$

where k is nearly equal to 0.5.

Figure 9:
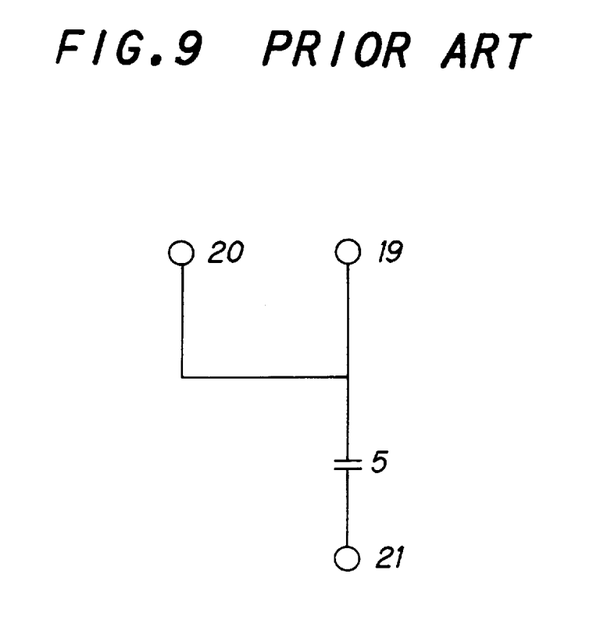
FIG. 9 is a diagram of the internal circuit of the externally-provided high-voltage capacitor used in the flyback transformer of FIG. 6.

FIG. 9 is an internal circuit diagram of the externally-provided high-voltage capacitor 5. In FIG. 9, the reference numerals 19, 20 and 21 designate an anode cap, a high-voltage connector and a ground terminal which are connected to each other as shown in the drawing.

Figure 10:
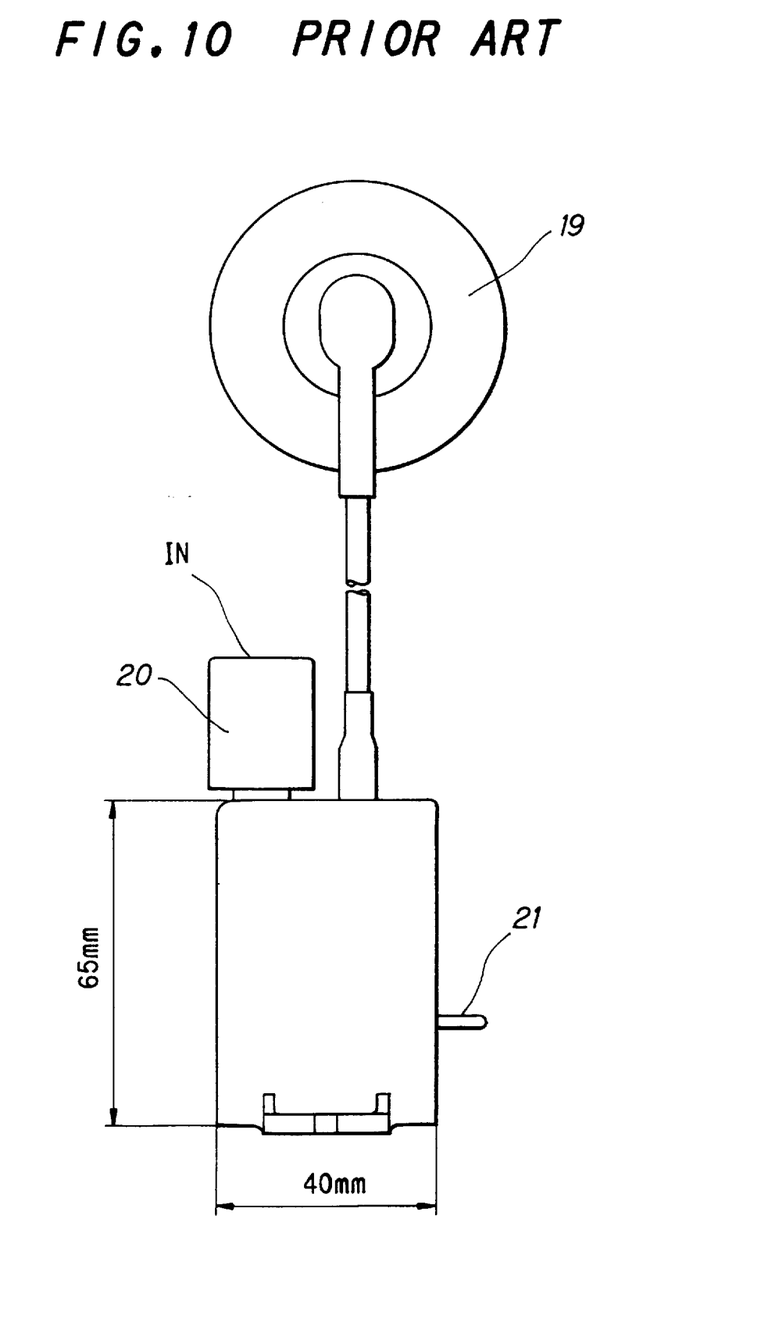
FIG. 10 is a view showing the appearance of the externally-provided high-voltage capacitor of FIG. 6.

In such a conventional technique, the externally-provided high-voltage capacitor 5 of the FBT 1 requires a large-sized exterior housing of about 40 mm×40 mm×65 mm and a large amount of injection resin (epoxy resin or the like) because the externally-provided high-voltage capacitor 5 has to be subjected to insulation against a high voltage as shown in FIG. 10, so that there arises problems that the externally-provided high-voltage capacitor is expensive in cost, is limited in place of provision in the display monitor, and is difficult in handling in view of its structure.

Further, there is another problem that it is difficult to ensure the reliability of a high-voltage connecting portion (the high-voltage connector 20) because high-voltage connection is required.

SUMMARY OF THE INVENTION

It is therefore an object of the present invention to provide a flyback transformer in which an alternating electric field can be reduced without using any expensive externally-provided high-voltage capacitor insulated by an exterior housing and injection resin, so that the flyback transformer is inexpensive, can be insulated easily against a high voltage, and is easy in handling.

In order to achieve the above object, according to the present invention, a flyback transformer comprises: a primary-side coil; a secondary-side high-voltage coil divided into a predetermined number of coil pieces; high-voltage rectifier diodes connected, in the same polarity, in series with the coil pieces respectively so as to form a series circuit as a whole; a high-voltage capacitor connected to a cathode side of one of the high-voltage rectifier diodes located in a final stage of the series circuit; and an in-phase high-voltage coil reversely connected to the one high-voltage rectifier diode in the final stage of the series circuit so that a reverse pulse generated by the in-phase high-voltage coil is superimposed on the cathode side of the one high-voltage rectifier diode.

Preferably, the coil pieces of the secondary-side high-voltage coil are wound one on one and the in-phase high-voltage coil is provided on an outside of an outermost one of the coil pieces of the secondary-side high-voltage coil.

Preferably, the in-phase high-voltage coil is located on the outermost one of the coil pieces of the secondary-side high-voltage coil at a central portion or one end portion thereof in an axial direction.

Thus, according to the present invention, the pulse which has an amplitude equivalently equal to the alternating electric field and generated by the in-phase high-voltage coil reversely connected in the secondary side is superimposed to the junction between the built-in high-voltage capacitor and the cathode side of the high-voltage rectifier diode in the final stage of the series circuit of alternating connection of the secondary-side high-voltage coil pieces and the high-voltage rectifier diodes, so that the amplitude of the alternating electric field can be reduced effectively.

Accordingly, it is not necessary to provide an expensive externally-provided high-voltage capacitor insulated by an exterior housing and injection resin, so that high-voltage insulation can be provided easily and inexpensively and the handling can be performed easily.

DESCRIPTION OF THE PREFERRED EMBODIMENTS

Embodiments of the present invention will be described below on the basis of the drawings.

Figure 1:
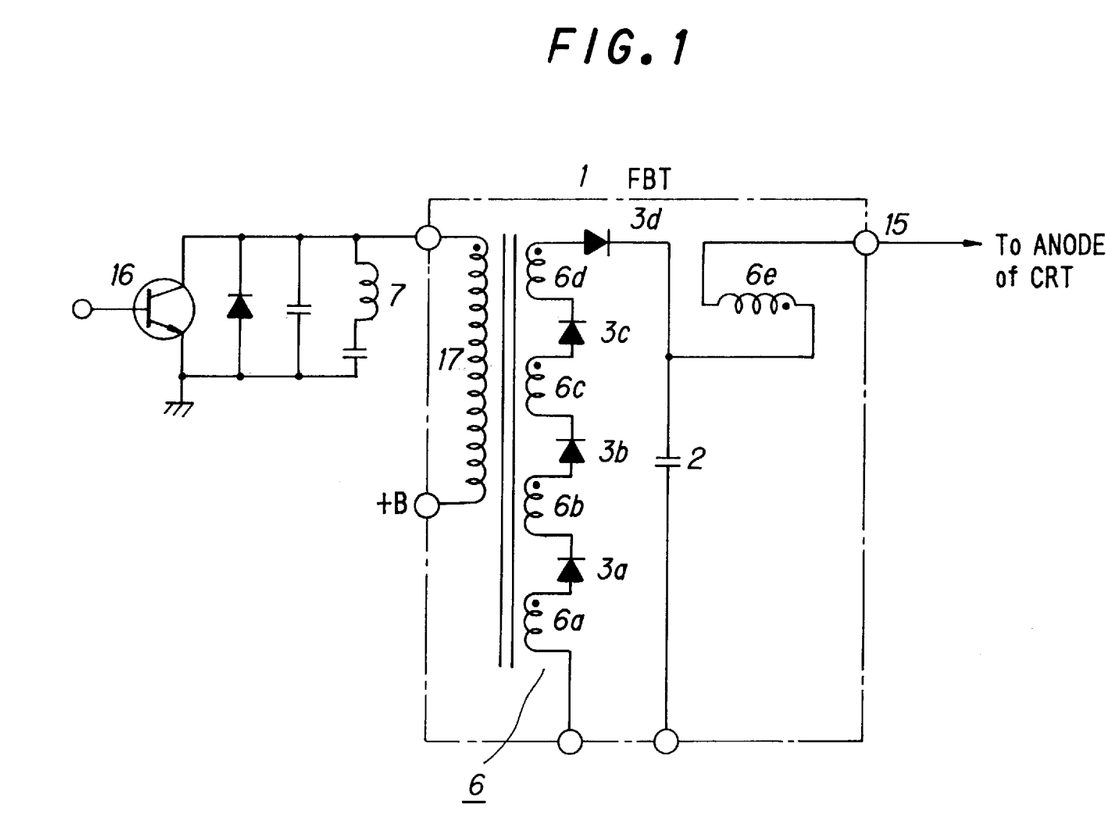
FIG. 1 is a circuit diagram of a flyback transformer according to a first embodiment of the present invention.

FIG. 1 is a circuit diagram of the flyback transformer according to a first embodiment of the present invention. In FIG. 1, parts the same as those in FIG. 6 are referenced correspondingly and the description thereof is omitted here. In FIG. 1, similarly to the above-mentioned conventional case, a secondary-side high-voltage coil 6 is divided into a predetermined number of coil pieces 6a–6d, and the high-voltage rectifier diodes 3a–3d are connected, in the same polarity as shown in the drawing, to the respective output sides, that is, the winding-terminating ends, of the secondary-side high-voltage coil pieces 6a–6d to thereby form a series circuit of the coil piece 6a, the diode 3a, the coil piece 6b, the diode 3b, the coil piece 6c, the diode 3c, and the coil piece 6d, and the diode 3d in order. Further, a built-in high-voltage capacitor 2 is connected to the cathode of the high-voltage rectifier diode 3d in the final stage of the series circuit, and a reverse pulse generating coil 6e which is in phase with the secondary-side high-voltage coil 6 is reversely connected between the cathode of the high-voltage rectifier diode 3d and the cathode-ray tube.

Figure 2:
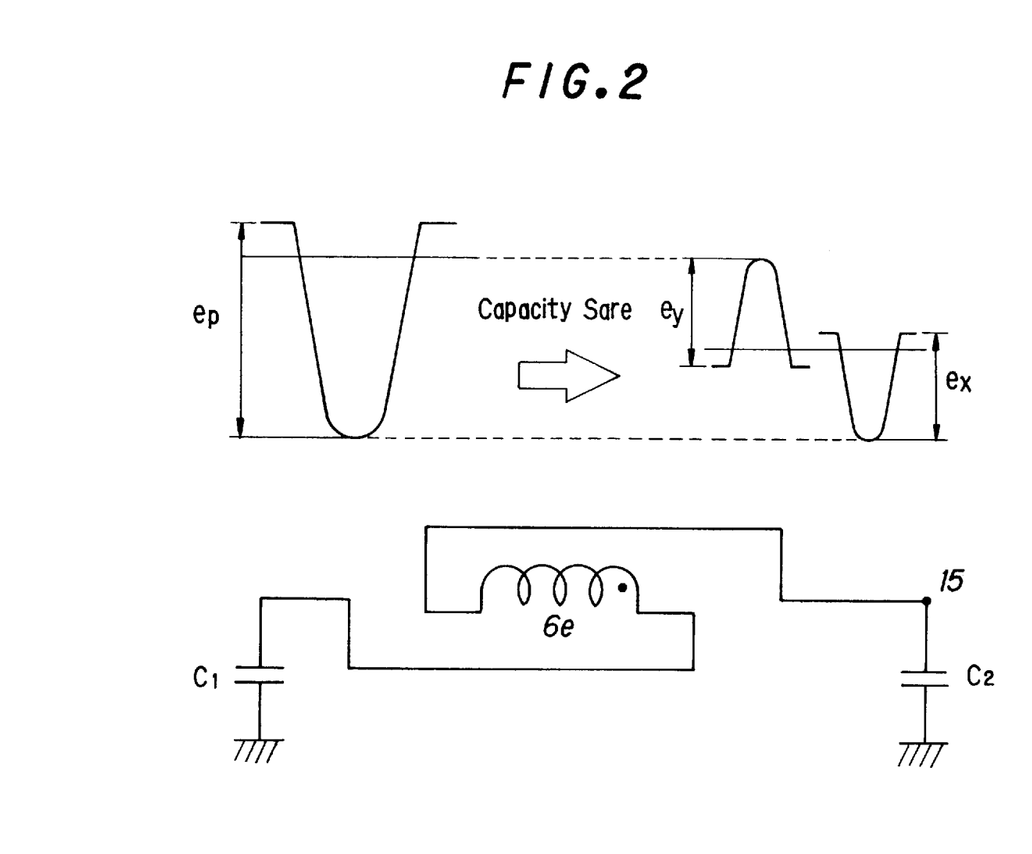
FIG. 2 is a diagram showing an equivalent circuit of a high-voltage coil for generating a reverse pulse in the flyback transformer of FIG. 1.

FIG. 2 is a diagram showing an equivalent circuit of the reverse-pulse generating coil 6e. Let the collector pulse generated at the collector of the horizontal output transistor 16 be represented by $V_{cp}$, the number of turns of the primary-side coil 17 be represented by $N_1$, and the number of turns of the reverse-pulse generating coil 6e be represented by $e_2$, then the peak value $e_p$ of the pulse generated between the opposite terminals of the reverse-pulse generating coil 6e is expressed by the following expression (2):

$$e_p = -(V_{cp} \times e_2)/N_1 \quad (2)$$

In FIG. 2, the peak value $e_p$ of the pulse generated between the opposite terminals of the reverse-pulse generating coil 6e is capacity-shared by a capacity $C_1$ of the built-in high-voltage capacitor 2 and a capacity $C_2$ of the cathode-ray tube 11. The peak value $e_x$ of the pulse generated at the anode point 15 of the cathode-ray tube 11 is expressed by the following expression (3):

$$e_x = e_p \times [C_1/(C_1+C_2)] \times K' \quad (3)$$

where the constant K' varies depending on the winding position of the reverse-pulse generating coil 6e, the distributed capacity between coils in the surroundings, etc.

On the other hand, in the alternating electric field reducing system shown in FIG. 7, the pulse $V_{DY}'$ on an interior graphite film 8 which generates an alternating electric field VLEF is expressed by the following expression (4):

$$k \times C_{DY}(60pF) \times V_{DY}(1000V_{pp}) = 3 \times 10E-8[C] \quad (4)$$

where k is nearly equal to 0.5.

The peak value $e_x$ of the reverse pulse of the reverse-pulse generating coil $6_e$ to be superimposed to cancel the alternating electric field is selected so that the electric charges to be superimposed become equal to $-3 \times 10E-8[C]$. This selection of the peak value $e_x$ is determined by the capacity $C_1$ of the built-in high-voltage capacitor 2 of the above expression (3), the capacity $C_2$ of the cathode-ray tube 11, and the peak value $e_p$ of the pulse generated between the opposite terminals of the reverse-pulse generating coil 6e.

If the number of turns $e_2$ of the reverse-pulse generating coil 6e is determined taking the capacity of the built-in high-voltage capacitor 2 into consideration, and when the reverse pulse $e_x$ is superimposed to the interior graphite film 8, the amplitude of the pulse voltage $V_{DY}'$ which generates the alternating electric field VLEF is reduced.

If the number of turns $e_2$ of the reverse-pulse generating coil 6e is increased, however, lose increases. Accordingly, it is necessary to suitably determine the values of the capacity $C_1$ of the built-in high-voltage capacitor 2, the capacity $C_2$ of the cathode-ray tube 11, and the number of turns $e_2$ of the reverse-pulse generating coil 6e so that the alternating electric field can be canceled while the loss is suppressed.

In the configuration of FIG. 1, the cathode-ray tube 11 has a limit in capacity in view of its structure and the built-in high-voltage capacitor 2 is provided inside the FBT 1 in order to correct the capacity of the cathode-ray tube. This high-voltage capacity (the sum of the capacity of the built-in high-voltage capacitor and the capacity of the cathode-ray tube) is provided to stabilize the high voltage. If this high-voltage capacity is small, such a phenomenon as tortuosity may be caused on an image plane of the cathode-ray tube 11.

The peak value $e_p$ of the pulse generated between the opposite terminals of the reverse-pulse generating coil 6e can be adjusted by changing the capacity of the built-in high-voltage capacitor 2. That is, if the capacity of the built-in high-voltage capacitor 2 is made large, the peak value $e_p$ becomes high, while if the capacity of the built-in high-voltage capacitor 2 is made small, the peak value $e_p$ becomes low.

According to the present invention, the capacity function for applying the reverse pulse to the anode electrode of the cathode-ray tube and the cathode-ray tube capacity function for stabilizing the high voltage are performed by one built-in high-voltage capacitor 2.

Figure 3:
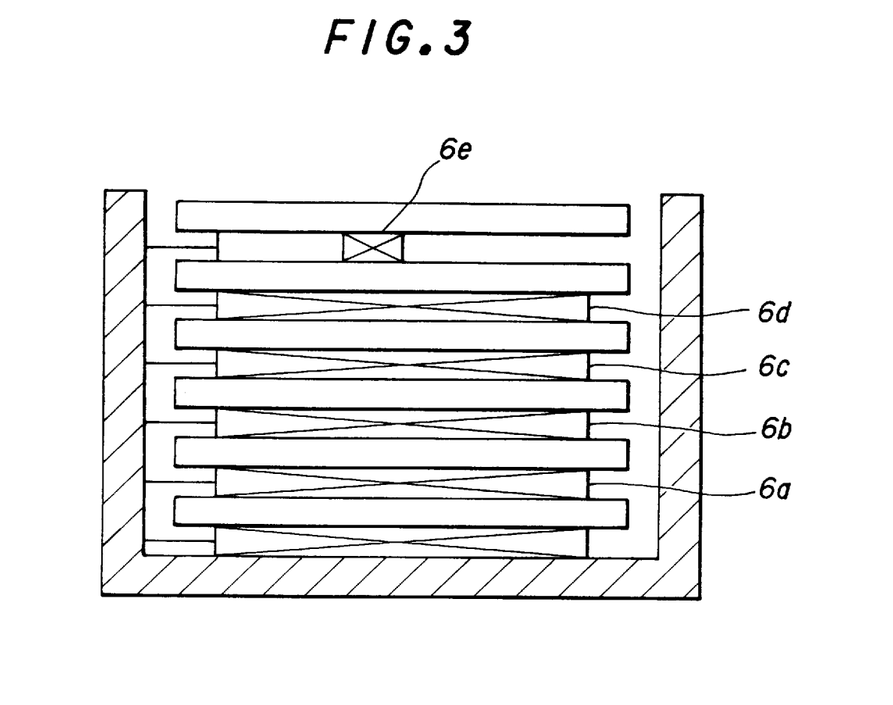
FIG. 3 is a view showing the internal structure of the flyback transformer of FIG. 1.

FIG. 3 is a structural view specifically showing the coil winding position inside the FBT 1. As shown in FIG. 3, the high-voltage coil pieces 6a to 6d are wound one on one in order, and the reverse-pulse generating coil 6e is wound on the high-voltage coil piece 6d as an uppermost layer and so as to be positioned at a substantially central portion of the high-voltage coil piece 6d in its axial direction.

Figure 4:
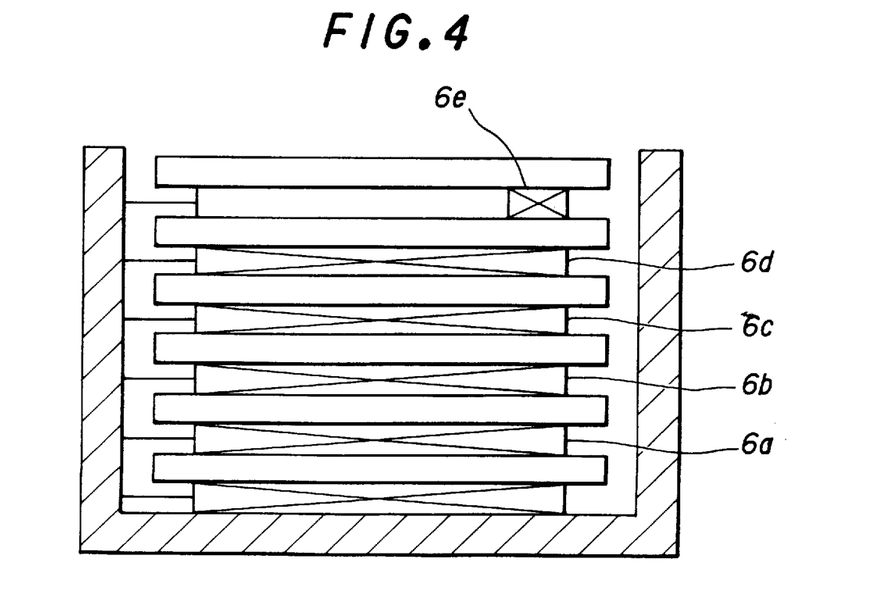
FIG. 4 is a view showing a modification of the internal structure of FIG. 3 in which the winding position of the reverse pulse generating coil is changed.

FIG. 4 shows an example in which the reverse-pulse generating coil 6e is wound on the high-voltage coil piece 6d as an uppermost layer and so as to be positioned at an end portion of the high-voltage coil piece 6d in its axial direction. Also in this case, of course, a reverse pulse is generated to thereby exhibit a similar effect to the case of FIG. 3.

In each of FIGS. 3 and 4, the illustration of the high-voltage rectifier diodes 3a–3d is omitted only for the sake of simplification of the drawings.

The winding position of the reverse-pulse generating coil 6e shown in FIG. 3 is more preferable in view of the configuration of insulation than that shown in FIG. 4, because the potential difference between the lead wire (not shown) at each end of the reverse-pulse generating coil 6e and the coil piece 6d under the reverse-pulse generating coil 6e in FIG. 3 is about ½ of that in FIG. 4.

Figure 5:
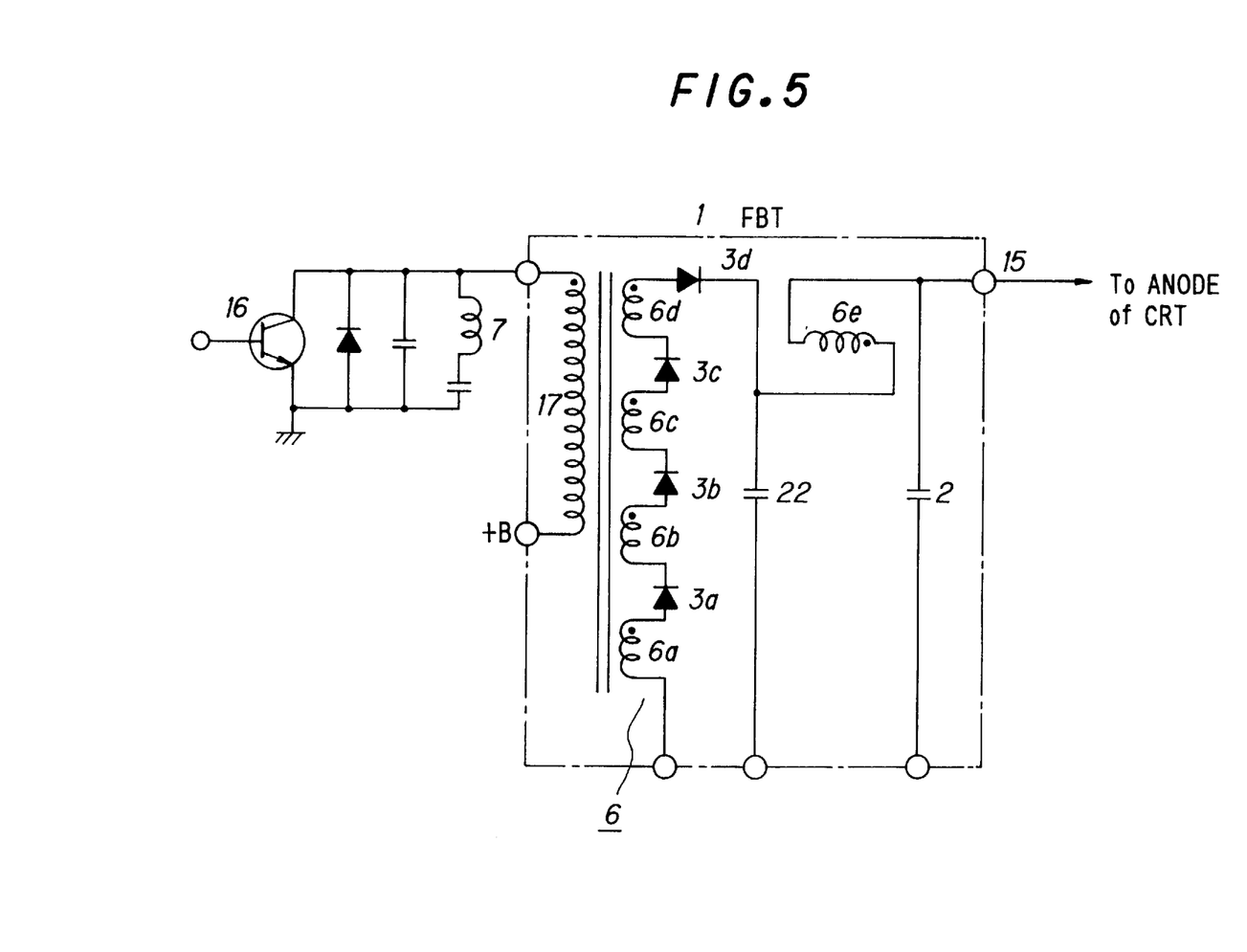
FIG. 5 is a circuit diagram of a flyback transformer according to a second embodiment of the present invention.

FIG. 5 is a diagram showing a second embodiment of the present invention. In this embodiment, as shown in the drawing, a reverse pulse application capacitor 22 and a built-in high-voltage capacitor 2 are provided separately from each other. Other points of the configuration are the same as those in the first embodiment.

According to the present invention, a high-voltage coil in phase with a secondary-side high-voltage coil is reversely connected so as to generate a reverse pulse having an amplitude equivalently equal to an alternating electric field, and the thus obtained reverse pulse is superimposed to a junction between the anode of the built-in high-voltage capacitor and the cathode of a high-voltage rectifier diode in the final stage of a series circuit of the secondary-side high-voltage coil pieces and the high-voltage rectifier diodes, whereby a horizontal pulse of a deflecting yoke induced on an interior graphite film of a cathode-ray tube can be canceled by this reverse pulse. Accordingly, any expensive externally-provided high-voltage capacitor which is insulated by an exterior housing and injection resin is not required so that the it is possible to provide a flyback transformer which is inexpensive in cost, which is high in reliability in view of insulation because a high-voltage portion is integrally insulated by epoxy resin, and which is easy in handling in view of structure.

What is claimed is:

1. A flyback transformer comprising: a primary-side coil; a secondary-side high-voltage coil divided into a predetermined number of coil pieces; high-voltage rectifier diodes connected, in the same polarity, in series with said coil pieces respectively so as to form a series circuit as a whole; a high-voltage capacitor connected to a cathode side of one of said high-voltage rectifier diodes located in a final stage of said series circuit; and an in-phase high-voltage coil reversely connected to said one high-voltage rectifier diode in the final stage of said series circuit so that a reverse pulse generated by said in-phase high-voltage coil is superimposed on the cathode side of said one high-voltage rectifier diode.

2. A flyback transformer according to claim 1, wherein said coil pieces of said secondary-side high-voltage coil are wound one on one and said in-phase high-voltage coil is provided on an outside of an outermost one of said coil pieces of said secondary-side high-voltage coil.

3. A flyback transformer according to claim 2, wherein said in-phase high-voltage coil is located on said outermost one of said coil pieces of said secondary-side high-voltage coil at a central portion thereof in an axial direction.

4. A flyback transformer according to claim 2, wherein said in-phase high-voltage coil is located on said outermost one of said coil pieces of said secondary-side high-voltage coil at one end portion thereof in an axial direction.

* * * * *

UNITED STATES PATENT AND TRADEMARK OFFICE
CERTIFICATE OF CORRECTION

PATENT NO. : 5,828,557
DATED : October 27, 1998
INVENTOR(S) : Sugawara et al.

It is certified that error appears in the above-indentified patent and that said Letters Patent is hereby corrected as shown below:

On the cover page, please substitute the attached Fig. 1 for the Fig. 1 shown thereon.

Signed and Sealed this

Sixteenth Day of March, 1999

Attest:

Q. TODD DICKINSON

Attesting Officer     Acting Commissioner of Patents and Trademarks

United States Patent [19]
Sugawara et al.

[11] Patent Number: 5,828,557
[45] Date of Patent: Oct. 27, 1998

[54] FLYBACK TRANSFORMER

[75] Inventors: Yoshihiko Sugawara; Hideyuki Mochida, both of Yokohama, Japan

[73] Assignee: Hitachi Media Electronics Co., Ltd., Iwate-ken, Japan

[21] Appl. No.: 739,203

[22] Filed: Oct. 30, 1996

[30] Foreign Application Priority Data

Oct. 31, 1995 [JP] Japan .................. 7-283602

[51] Int. Cl.⁶ .................. H02M 3/335; H01J 29/70
[52] U.S. Cl. .................. 363/20; 363/21; 315/411
[58] Field of Search .................. 363/20, 21; 315/411; 348/730

[56] References Cited

U.S. PATENT DOCUMENTS

| | | | |
|---|---|---|---|
| 4,639,663 | 1/1987 | Ueno et al. | 363/20 |
| 4,866,353 | 9/1989 | Haferl | 315/411 |
| 5,043,598 | 8/1991 | Maeda et al. | 363/21 |
| 5,218,270 | 6/1993 | Haapakoski | |
| 5,394,067 | 2/1995 | Santelmann, Jr. | 363/21 |
| 5,466,994 | 11/1995 | Akimoto et al. | 315/411 |
| 5,644,198 | 7/1997 | Park | 363/20 |

Primary Examiner—Stuart N. Hecker
Attorney, Agent, or Firm—Evenson, McKeown, Edwards & Lenahan, P.L.L.C.

[57] ABSTRACT

A flyback transformer which comprises: a primary-side coil; a secondary-side high-voltage coil divided into a predetermined number of coil pieces; high-voltage rectifier diodes connected, in the same polarity, in series with the coil pieces respectively so as to form a series circuit as a whole; a high-voltage capacitor connected to a cathode side of one of the high-voltage rectifier diodes located in a final stage of the series circuit; and an in-phase high-voltage coil reversely connected to the one high-voltage rectifier diode in the final stage of the series circuit so that a reverse pulse generated by the in-phase high-voltage coil is superimposed on the cathode side of the one high-voltage rectifier diode. Thus, an alternating electric field can be reduced without using any expensive externally-provided high-voltage capacitor which is insulated by an exterior housing and injection resin to thereby make it possible to provide a flyback transformer which is inexpensive in cost, which is high in reliability in view of insulation, and which is easy in handling.

4 Claims, 9 Drawing Sheets

FIG. 1